United States Patent
Wang et al.

(10) Patent No.: US 10,565,439 B2
(45) Date of Patent: Feb. 18, 2020

(54) METHOD AND SYSTEM FOR TRACKING WORKERS AT WORKSITES

(71) Applicant: Caterpillar Inc., Peoria, IL (US)

(72) Inventors: Qi Wang, Pittsburgh, PA (US); Yihong Yang, Champaign, IL (US); Praveen Halepatali, Savoy, IL (US); Nolan Finch, Chicago, IL (US); Christopher Ha, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 127 days.

(21) Appl. No.: 15/728,533

(22) Filed: Oct. 10, 2017

(65) Prior Publication Data
US 2019/0108392 A1   Apr. 11, 2019

(51) Int. Cl.
*G06K 9/00* (2006.01)
*G06T 7/60* (2017.01)
*G06T 7/90* (2017.01)
*G06K 9/62* (2006.01)
*G06T 7/246* (2017.01)
*G06K 9/20* (2006.01)

(52) U.S. Cl.
CPC ..... *G06K 9/00362* (2013.01); *G06K 9/00335* (2013.01); *G06K 9/00718* (2013.01); *G06K 9/00771* (2013.01); *G06K 9/2054* (2013.01); *G06K 9/6202* (2013.01); *G06T 7/246* (2017.01); *G06T 7/60* (2013.01); *G06T 7/90* (2017.01); *G06T 2200/28* (2013.01); *G06T 2207/10016* (2013.01); *G06T 2207/10024* (2013.01); *G06T 2207/30196* (2013.01); *G06T 2207/30232* (2013.01)

(58) Field of Classification Search
CPC ............ G06K 9/00362; G06K 9/2054; G06K 9/6202; G06K 9/00771; G06K 9/00335; G06K 9/00718; G06T 2207/10016; G06T 2207/30232; G06T 2207/30196; G06T 2207/10024; G06T 7/246; G06T 7/90; G06T 7/60; G06T 2200/28
See application file for complete search history.

(56) References Cited

U.S. PATENT DOCUMENTS

| | | | |
|---|---|---|---|
| 6,272,250 B1* | 8/2001 | Sun | G06K 9/00711 382/155 |
| 7,343,617 B1* | 3/2008 | Katcher | H04N 21/234318 725/61 |
| 7,750,944 B2 | 7/2010 | Arbogast | |

(Continued)

FOREIGN PATENT DOCUMENTS

JP   2010089632   4/2010

*Primary Examiner* — Amara Abdi
(74) *Attorney, Agent, or Firm* — Lee & Hayes, PLLC (57) ABSTRACT

A method for tracking workers at a worksite is disclosed. The method includes acquiring a video of the worksite and detecting a movement of objects in the video. Each object is represented by a plurality of pixels. The method includes identifying an item associated with at least one object by clustering a set of pixels of the plurality of pixels based on a color of the set of pixels. Next, the method includes determining the item as a hard hat based on at least a shape of the set of pixels, and identifying the object as a specific worker based on the color of the set of pixels. The method also includes generating a movement data associated with the specific worker based on a tracking of the hard hat.

20 Claims, 6 Drawing Sheets

(56) References Cited

U.S. PATENT DOCUMENTS

| | | | |
|---|---|---|---|
| 9,158,975 B2 | 10/2015 | Lipton et al. | |
| 9,503,693 B2 | 11/2016 | Desimone et al. | |
| 2011/0025847 A1* | 2/2011 | Park | G06Q 10/06 348/143 |
| 2014/0056472 A1* | 2/2014 | Gu | G06K 9/00208 382/103 |
| 2015/0085111 A1 | 3/2015 | Lavery | |
| 2015/0345942 A1 | 12/2015 | Allocco et al. | |
| 2016/0267331 A1* | 9/2016 | Pillai | G06K 9/4642 |
| 2019/0080274 A1* | 3/2019 | Kovach | G06Q 10/0639 |

* cited by examiner

METHOD AND SYSTEM FOR TRACKING WORKERS AT WORKSITES

TECHNICAL FIELD

The present disclosure relates to work force management. More particularly, the present disclosure relates to method and system for tracking one or more workers at a worksite.

BACKGROUND

Several organizations have a large pool of workers, and keeping track of worker activity and productivity remains difficult. Any organization's performance may be dependent upon how effectively a worker pool is utilized, including how effectively a worker's inefficiency is identified and addressed.

Organizations generally undertake phenomenal efforts to track worker activity, however such efforts may incur costs. For example, efforts, such as a timekeeping of each worker may rely on manual supervision. However, manual supervision may provide a unilateral and largely subjective review of a worker, which may result in an incorrect computation of worker efficiency, and thus worker productivity. Moreover, for tracking a large pool of workers, a commensurately large pool of supervisors may be required. Such a requirement comes with added costs, and since it is desirable to have a reduced cost solution to tracking a worker activity, a simple and cost-effective alternative remains desirable.

United States Patent Application No. 2011/0025847 relates to a computer system for monitoring a worker driven process. The computer system includes a camera and a processing system configured to receive video of an area to be serviced by an employee and to identify a worker object within the received video by comparing an object within the video to pre-defined worker templates.

SUMMARY OF THE INVENTION

In one aspect, the disclosure is directed towards a method for tracking one or more workers at a worksite. The method includes acquiring, by a processor, a video of the worksite and detecting, by the processor, a movement of one or more objects in the video. Each object of the one or more objects is represented by a plurality of pixels in the video. The method also includes identifying an item associated with at least one object of the one or more objects by clustering a set of pixels of the plurality of pixels of the at least one object based on a color of the set of pixels. Further, the method includes determining, by the processor, the item as a hard hat associated with one of the one or more workers based on at least a shape of the set of pixels, and identifying a specific worker associated with the hard hat based on the color of the set of pixels. Additionally, the method includes generating a movement data associated with the specific worker based on a tracking of the hard hat. The movement data pertains to a change in a location of the specific worker during a duration of the video.

In another aspect, the disclosure relates to a server for tracking one or more workers at a worksite. The server includes a memory device and a processor. The memory device is configured to store a set of computer readable instructions. The processor is configured to execute the set of computer readable instructions. More particularly, the processor executes the computer readable instructions to acquire a video of the worksite and detect a movement of one or more objects in the video. Each object of the one or more objects is represented by a plurality of pixels in the video. Further, the computer readable instructions are executed to identify an item associated with at least one object of the one or more objects by clustering a set of pixels of the plurality of pixels of the at least one object based on a color of the set of pixels. The computer readable instructions are also executed to also determine the item as a hard hat associated with one of the one or more workers based on at least a shape of the set of pixels. Moreover, an execution of the computer readable instructions facilitates the identification of a specific worker associated with the hard hat based on the color of the set of pixels. Furthermore, an execution of the computer readable instructions facilitates generation of a movement data associated with the specific worker based on a tracking of the hard hat. The movement data pertains to a change in a location of the specific worker during a duration of the video.

In yet another aspect, the disclosure is directed to a system for tracking one or more workers at a worksite. The system includes one or more hard hats and a processor. The one or more hard hats are associated with the one or more workers. The processor is configured to acquire a video of the worksite, and detect a movement of one or more objects in the video, where each object of the one or more objects is represented by a plurality of pixels in the video. Further, the processor is configured to identify an item associated with at least one object of the one or more objects by clustering a set of pixels of the plurality of pixels of the at least one object based on a color of the set of pixels. The processor is also configured to determine the item as a hard hat of the one or more hard hats based on at least a shape of the set of pixels, and identify a specific worker associated with the hard hat based on the color of the set of pixels. In addition, the processor is configured to generate a movement data associated with the specific worker based on a tracking of the hard hat. The movement data pertains to a change in a location of the specific worker during a duration of the video.

DETAILED DESCRIPTION

Figure 1:
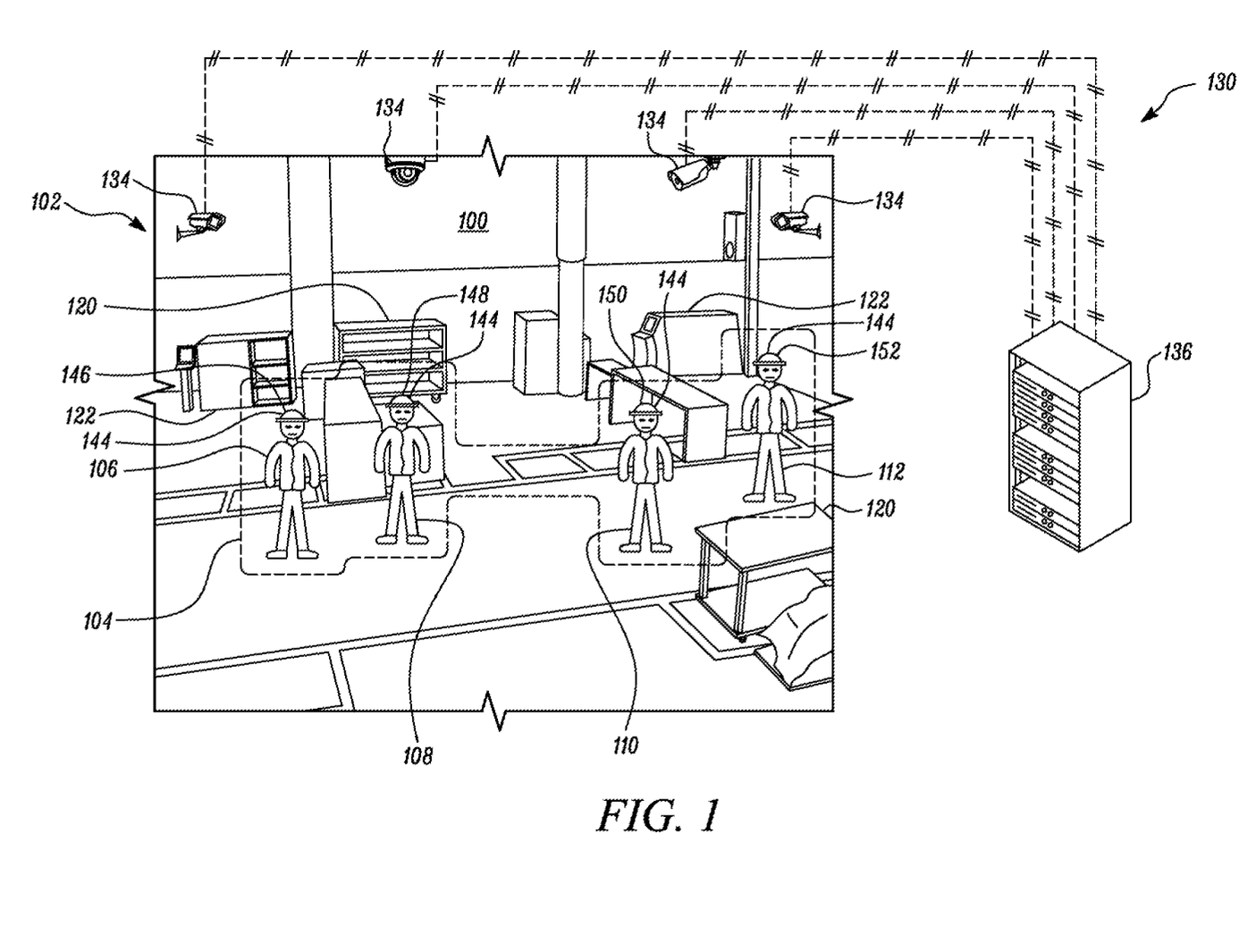
FIG. 1 is diagrammatic view of a worksite, illustrating a system with a server that tracks one or more workers at the worksite, in accordance with an embodiment of the disclosure.

Referring to FIG. 1, there is shown a worksite 100. The worksite 100 may be a shop-floor of a manufacturing facility 102 to which one or more aspects of the present disclosure are applicable. Aspects of the present disclosure may also be extended to other worksites, such as construction sites, mine sites, a landfill, and a quarry. One or more workers 104 may be stationed and/or be deployed at the worksite 100 to carry out one or more predefined tasks at the worksite 100. For example, and as shown in FIG. 1, four workers are shown. These workers include a first worker 106, a second worker 108, a third worker 110, and a fourth worker 112. Although four workers have been contemplated, a higher number of workers or a lower number of workers are possible.

The worksite 100 may also include mobile machines 120 and stationary machines 122. Mobile machines 120 and stationary machines 122 may be operable for performing certain predetermined tasks at the worksite 100. In an example, mobile machines 120 may include movable work tables, wheeled benches, etc. In an example, stationary machines 122 may include generators, compressors, etc.

Figure 2:
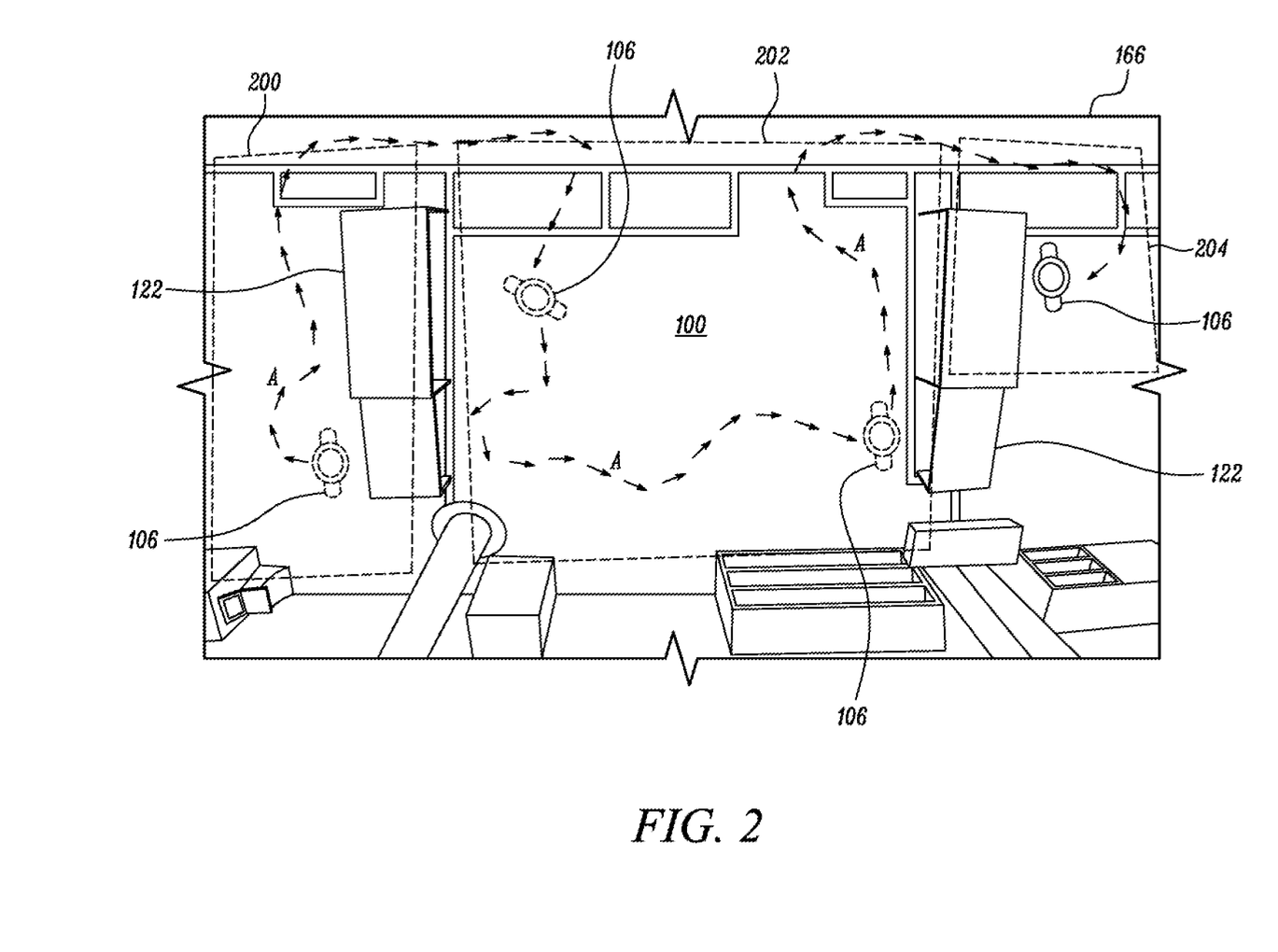
FIG. 2 is an exemplary screenshot captured by one or more image capturing devices installed at the worksite, in accordance with an embodiment of the disclosure.

During a work shift, one or more of the first worker 106, the second worker 108, the third worker 110, and the fourth worker 112, may move from one location to another location of the worksite 100. An exemplary movement path (depicted by arrows, A) of the first worker 106 is illustrated in FIG. 2. A movement of the first worker 106 may correspond to a time spent on a non-productive activity and/or to a transit between said locations. One embodiment of the present disclosure includes tracking a movement of each of the first worker 106, the second worker 108, the third worker 110, and the fourth worker 112, at the worksite 100, so as to compute a productive time spent by each of them at the worksite 100. To track the workers 104 (i.e. a movement of each of the first worker 106, the second worker 108, the third worker 110, and the fourth worker 112), and to compute a useful, productive time spent by each of them, the present disclosure envisages a system 130. According to one aspect, the system 130 includes one or more hard hats 144, one or more image capturing devices 134, and a server 136.

The hard hats 144 may be associated with the workers 104. For example, hard hats 144 may be worn by the workers 104, respectively, during a work shift at the worksite 100. In the depicted embodiment, the hard hats 144 are four in number. For example, the hard hats 144 include a first hard hat 146, a second hard hat 148, a third hard hat 150, and a fourth hard hat 152 (depicted in FIG. 1). The first hard hat 146 may be worn by the first worker 106, second hard hat 148 may be worn by the second worker 108, third hard hat 150 may be worn by the third worker 110, and fourth hard hat 152 may be worn by the fourth worker 112. It may be noted that the first hard hat 146, second hard hat 148, third hard hat 150, and fourth hard hat 152 may have a similar or a common shape. Further, each hard hat of the hard hats 144 may include a unique, distinctive attribute that may set it apart from the remaining hard hats. For example, each hard hat may include a color different and/or distinctive of a color relative to any of the other hard hats of the hard hats 144, enabling an identification (by the server 136) of each hard hat, and thus a wearer (i.e. a worker) corresponding each hard hat. In effect, therefore, each worker has a different color of an associated hard hat.

With continued reference to FIG. 1, and as an example, colors applied for the first hard hat 146, the second hard hat 148, the third hard hat 150, and the fourth hard hat 152, may include blue, orange, green, and yellow, respectively. The first worker 106 may wear the first hard hat 146 having a blue color. The second worker 108 may wear the second hard hat 148 having an orange color. The third worker 110 may wear the third hard hat 150 having a green color. The fourth worker 112 may wear the fourth hard hat 152 having a yellow color. In principle, the present disclosure relates to tracking the workers 104 at the worksite 100. To this end, tracking a movement of the hard hats 144 facilitates a tracking of the worker 104. A tracking of the first worker 106, the second worker 108, the third worker 110, and the fourth worker 112, by using the hard hats 144, the image capturing devices 134, and the server 136, will be understood from the discussions below.

Referring to FIGS. 1 and 2, the image capturing devices 134 may capture a video of the worksite 100 for monitoring the worksite 100, or a section of the worksite 100. For example, the image capturing devices 134 are configured to record various activities performed by the workers 104 at the worksite 100. Various activities may include a movement of the workers 104 at the worksite 100, for example. The image capturing devices 134 may include and/or represent a number of cameras. For example, see section 166 captured by the one or more image capturing devices 134 in FIG. 2. Exemplarily, the section 166, as provided in FIG. 2, depicts a movement of the first worker 106 captured by the one or more image capturing devices 134. It may be contemplated that each image capturing device of the image capturing devices 134 may capture a video of different sections of the worksite 100, and it is possible that in such videos, any number of the workers 104 may be present. Further, each of the image capturing devices 134 may be configured to transmit a captured video (of the section 166, for example) to the server 136.

The image capturing devices 134 may be positioned at various predetermined locations and in various orientations at the worksite 100, and may facilitate acquisition of videos (or a variety of videos) of the worksite 100. In one example, one or more of the image capturing devices 134 may be configured to capture a top view (or a plan view) of the worksite 100 (see example view provided in FIG. 2). This is possible by mounting one or more image capturing devices 134 to a ceiling (not shown) of the manufacturing facility 102. Similarly, one or more of the image capturing devices 134 may be mounted to posts or columns (not shown) of the manufacturing facility 102 to obtain a three quarters view (or a perspective view) of the worksite 100 (see example view provided in FIG. 1). Various other views, from various other viewing angles, are possible.

Figure 4:
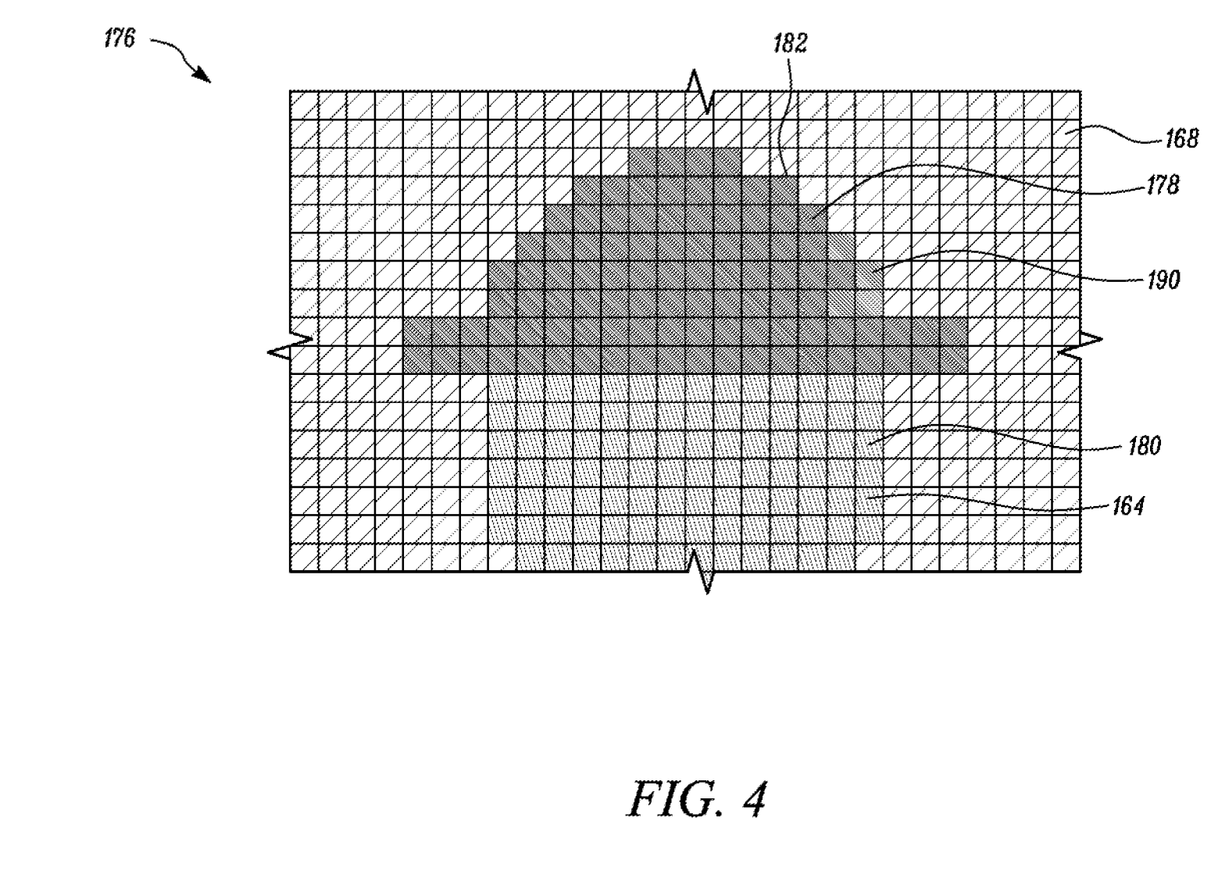
FIG. 4 is an exemplary representation of a portion of video captured by the one or more image capturing devices, in accordance with an embodiment of the disclosure.

Referring to FIGS. 1 and 4, the image capturing devices 134 may be configured to capture a video of the worksite 100 in a digitized form. For example, the image capturing devices 134 may capture the workers 104, mobile machines 120, stationary machines 122, at the worksite 100. A video of the workers 104, mobile machines 120, and stationary machines 122, may be represented as objects in the video. Each such object may be represented by multiple pixels in the video. For example, see object 164 in a portion of a video 176 illustrated in FIG. 4. The object 164 corresponds to the first worker 106, and is represented by multiple pixels 180 in the portion of video 176. Effectively, therefore, since workers 104 at the worksite 100 may periodically move, the workers 104 may be represented as moving objects in the video, having corresponding moving pixels in the video. Such capturing and segmentation (i.e. a representation of the objects as multiple pixels) of the video enables the video to be read, processed, and be analyzed by the server 136, and by which a movement of each of the workers 104 may be ascertained.

In an embodiment, the image capturing devices 134 include an image sensor. Some examples of the image sensor may include, but are not limited to, a complementary metal-oxide-semiconductor (CMOS) sensor, a charge coupled devices (CCD) sensor, a Light Detection and Ranging (LIDAR) sensor, and/or the like.

Figure 3:
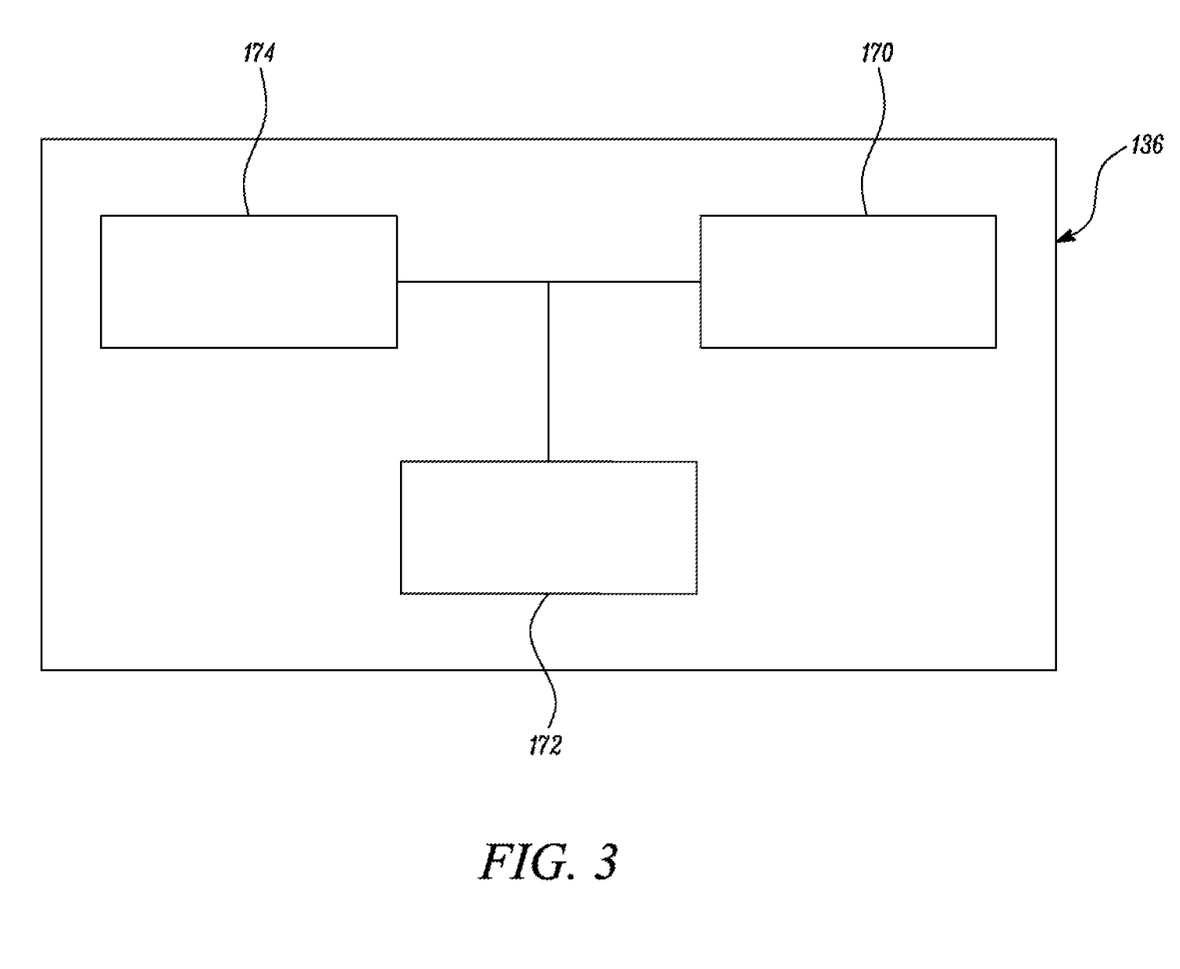
FIG. 3 is a schematic view of the server, illustrating components of the server, in accordance with an embodiment of the disclosure.

Referring to FIGS. 1 and 3, the server 136 is configured to process and store data pertaining to the movement of the workers 104. The server 136 may remain accessible to multiple user computers and workstations provided in and around the manufacturing facility 102. For example, the server 136 may be accessible to one or more stakeholders associated with the manufacturing facility 102, and/or to one or more operators/supervisors associated with monitoring the movement of the workers 104 at the worksite 100. To this end, the server 136 may be communicably coupled to the image capturing devices 134 so as to obtain and process a video captured by the image capturing devices 134.

In one example, the server 136 may be remotely located, or in some cases, the server 136 may be located in situ (i.e. within and/or around the manufacturing facility 102 or relatively close to the worksite 100). In some cases, the server 136 may be a file server, and data files pertaining to the video obtained from the image capturing devices 134 may be stored in the server 136 for later retrieval and use. For such storage, the server 136 may include a memory device 170. To this end, the server 136 may be communicably coupled to the image capturing devices 134, such as wirelessly or by any conventional link such as ethernet, so as to receive videos (such as an uninterrupted video of the section 166 of the worksite 100 during a work shift, for every shift, for example) as input. In one implementation, the server 136 may include one or more computing devices, such as a computer that may run a server program, and which may facilitate a processing of the video obtained from the image capturing devices 134.

Further, the server 136 may include power electronics, preprogrammed logic circuits, data processing circuits, associated input/output buses, volatile memory units, such as random access memory (RAM) to help process the video obtained from the image capturing devices 134. To this end, the server 136 may include a microprocessor based device, that may be implemented as an application-specific integrated circuit, or other logic device, and such devices being known to those with ordinary skill in the art. In some implementations, the server 136 may form a portion of one of an existing database deployed within (or outside) the worksite 100, or may be configured to function as a stand-alone entity. While the memory device 170 and may form a part of the server 136, it may be noted that server 136 further includes a transceiver 172 and a processor 174.

Referring to FIG. 3, the transceiver 172 may enable communication between the image capturing devices 134 and the server 136. Such communication may be made possible by using one or more communication protocols, such as, I2C®, Zigbee®, Infrared, and Bluetooth®. Additionally, the transceiver 172 may be further configured to transmit and receive messages and data to/from various devices/machines operating in (or remotely relative to) the worksite 100 over a communication network. For example, multiple user computers and workstations provided in and around the manufacturing facility 102 may be communicably coupled to the server 136 in accordance with the various communication protocols, such as, TCP/IP, UDP, and 2G, 3G, or 4G communication protocols.

The memory device 170 is coupled to the processor 174 and to the image capturing devices 134, and is configured to store a set of instructions that are executable by the processor 174 to perform a predetermined operation. For example, the set of instructions are a set of computer readable instructions that may be executed by the processor 174 to determine one or more of the hard hats 144, and then accordingly deduce an identify of any of the workers 104 associated with the one or more of the hard hats 144. The memory device 170 may store a predefined color associated with each hard hat of the hard hats 144. More particularly, the memory device 170 may further include or store charts and tables that may include data pertaining to every color (i.e. blue, orange, green, and yellow, in this case), and against which an identity of each worker of the workers 104 may be tagged for comparison and identification as the set of instructions (or a set of computer readable instructions) may be executed by the processor 174. As an example, charts and tables may include data corresponding to each of the hard hats 144, and the colors associated with each of those hard hats 144.

The memory device 170 may additionally or optionally store data pertaining to a color, as shape, and/or a size of each of the hard hats 144, as well. In some embodiments, the memory device 170 may store data pertaining to the identity of each worker of the workers 104, for example, a worker name, a worker code (or employee code), reporting supervisor, a time since and a time till a worker's presence has been identified within the worksite 100, a weekly, monthly, and/or yearly data (discussed later) pertaining to a productive time spent by a worker in the worksite 100, etc. Therefore, charts and tables may also include other data corresponding to the workers 104, alongside a color of a hard hat associated with each worker. In some embodiments, it is possible for the memory device 170 to include one or more of a Solid-state drive (SSD), a hard drive (HD) drive, a portable disk, USB (Universal Serial Bus) drive, memory stick, flash drives, and similar such devices known to those of skill in the art.

The processor 174 may be communicably coupled to each of the image capturing devices 134, and also to each of the transceiver 172 and the memory device 170. The processor 174 is configured to acquire and analyze the video and/or the image captured by one or more of the image capturing devices 134 to track one or more of the workers 104 at the worksite 100. In principle, the processor 174 is configured to identify a specific worker associated with each of the hard hats 144. Further, the processor 174 is configured to generate a movement data associated with the specific worker based on a tracking of the hard hats 144. The movement data pertains to a change in a location of the specific worker during a duration of the video.

In an embodiment, the processor 174 may be a microprocessor configured within the server 136. The processor 174 may also be configured to control an operation of the image capturing devices 134, the transceiver 172, and the memory device 170, as well. Examples of the processor 174 include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor. In some implementations, it is possible for the processor 174 to be located on the one or more image capturing devices 134 instead of being a part of the server 136, and thus may be configured to receive a direct video feed from the image capturing devices 134.

For ease in reference and clarity, various aspects of the forthcoming discussions may include references to the first worker 106, and correspondingly, the first hard hat 146 alone. It will be understood that such discussions will be applicable to the remaining workers (and thus to the remaining hard hats), as well. Wherever required, however, references to the second worker 108, the third worker 110, the fourth worker 112, and correspondingly, the second hard hat 148, the third hard hat 150, and the fourth hard hat 152, may also be made.

For identifying the first hard hat 146, and thus the first worker 106 associated with the first hard hat 146, the processor 174 is configured to execute the set of computer readable instructions and perform the predetermined operation. Mare particularly, the processor 174 is configured to acquire a video of the worksite 100—see the portion of video 176 or an image frame of the video depicted in FIG. 4 captured by the one or more of the image capturing devices 134. Having acquired the video by the processor 174, the processor 174 may detect objects in the video. Detected objects may correspond to one or more of the workers 104, the mobile machines 120, and the stationary machines 122, at the worksite 100. Since the objects in the video may be represented as having multiple pixels, the objects may be read by the processor 174.

Further, the processor 174 is configured to detect a movement of one or more of these objects in the video. Since each object of the one or more objects may be represented as multiple pixels in the video, the processor 174 may identify an item associated with each object by clustering a set of pixels of the multiple pixels based on a color of the set of pixels. Said item associated with each object (such as a moving object) may correspond to any actual article at the worksite 100. Such an actual article may be in physical engagement with any of the workers 104, the mobile machines 120, and the stationary machines 122. For example, a mobile machine such as a crane (not shown) may include a hook, and accordingly, the processor 174 may detect the crane as the object in the video and may identify the hook as the item associated with the object in the video. In an embodiment, the processor 174 may identify the item as the hook since the hook may move in sync with a movement of the crane.

According to an exemplary working scenario, therefore, and as shown in FIG. 4, the processor 174 detects a movement of the object 164 and may identify an item 182 associated with the object 164. Such identification is performed by clustering a set of pixels 178 of the multiple pixels 180 based on a color of the set of pixels 178. For example, the set of pixels 178 may have a same color. Thereafter, the processor 174 is configured to determine whether the item 182 is the any one of the hard hats 144, such as first hard hat 146, based on at least a shape of the set of pixels 178.

Thereafter, the processor 174 is configured to identify the specific hard hat that the item 182 corresponds to. To identify the item 182 as a specific hard hat, the processor 174 compares the color of the set of pixels 178 to a predefined color associated with each of the hard hats 144. It may be noted that a color of each of the hard hats 144 may be stored as a predefined color data in the memory device 170. Since there are four colors correspondingly belonging to the four hard hats (as is exemplarily provided in this disclosure), the processor 174 is configured to compare the color of the set of pixels 178 against the four colors. Such a comparison fetches a result—that the set of pixels 178 is identified to have a specific color out of the four colors. Accordingly, the specific hard hat having the same color as that has been detected of the set of pixels 178, is identified. For example, the color of the set of pixels 178 is detected to be blue, and accordingly, it is identified that the hard hat, represented by the set of pixels 178, is the first hard hat 146 that has a blue color.

Further, the processor 174 is configured to use charts and tables stored within the memory device 170 to identify the specific worker associated with the first hard hat 146 based on the color of the set of pixels 178. More particularly, since the first hard hat 146 is worn by the first worker 106, by use of charts and tables, the processor 174 is configured to identity the object 164 as the first worker 106. Once the object 164 is identified as the first worker 106, the processor 174 is configured to generate a movement data associated with the first worker 106 based on a tracking of the first hard hat 146. It may be noted that the movement data pertains to a change in a location of the first worker 106 during a duration of the video.

Further, in some embodiments, the server 136 may include a classifier (not shown), and such a classifier may be used to compare and match attributes of certain objects in the video to predefined attributes of objects stored within the memory device 170. For example, the classifier may be configured to categorize detected objects in the video in one or more categories. Such one or more categories may include, but are not limited to, a human category and a non-human category. A non-human category may include all articles other than humans, including the mobile machines 120, stationary machines 122, work tables, worksite infrastructure, and similar other objects conventionally found in a manufacturing facility. By way of the classifier, the objects that correspond to a human are categorized in the human category and all other objects may be categorized in the non-human category. In one example, the classifier may be used as a first level screening of the worksite 100 to first determine the workers 104 (that are humans), and having screened the workers, the specific hard hat corresponding to the specific worker of the workers 104 may be analyzed according to the method discussed above, and accordingly, the specific worker may be then identified.

INDUSTRIAL APPLICABILITY

Figure 5:
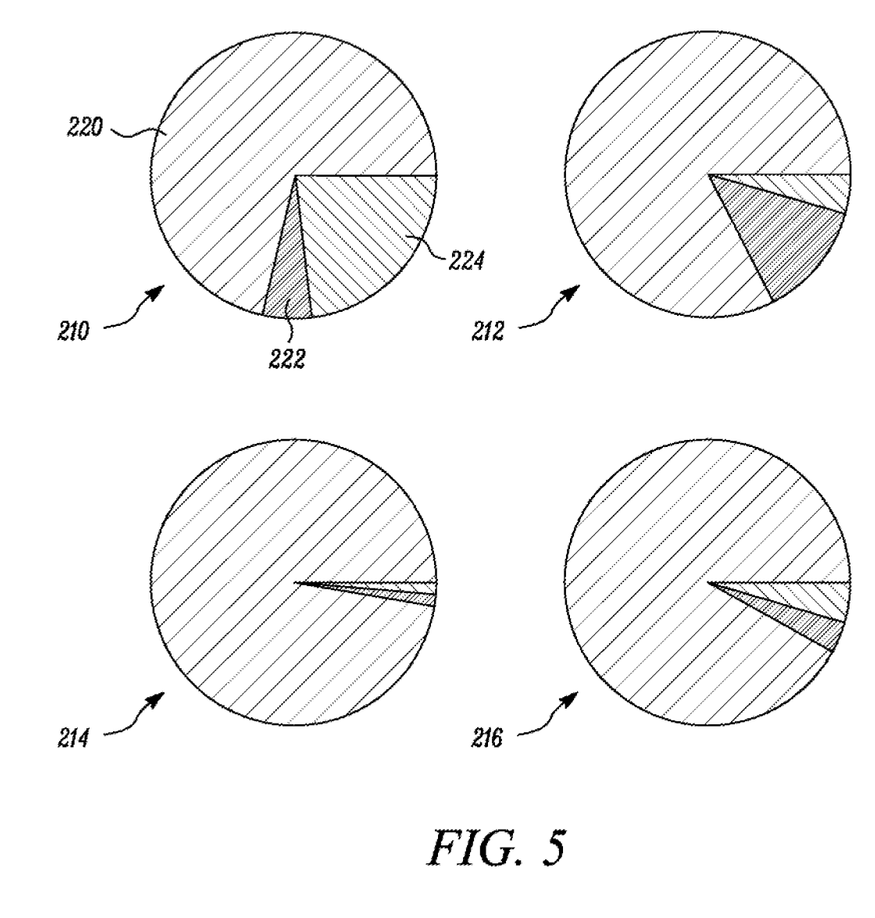
FIG. 5 is a representation of a movement data associated with the one or more workers, in accordance with an embodiment of the disclosure.
Figure 6:
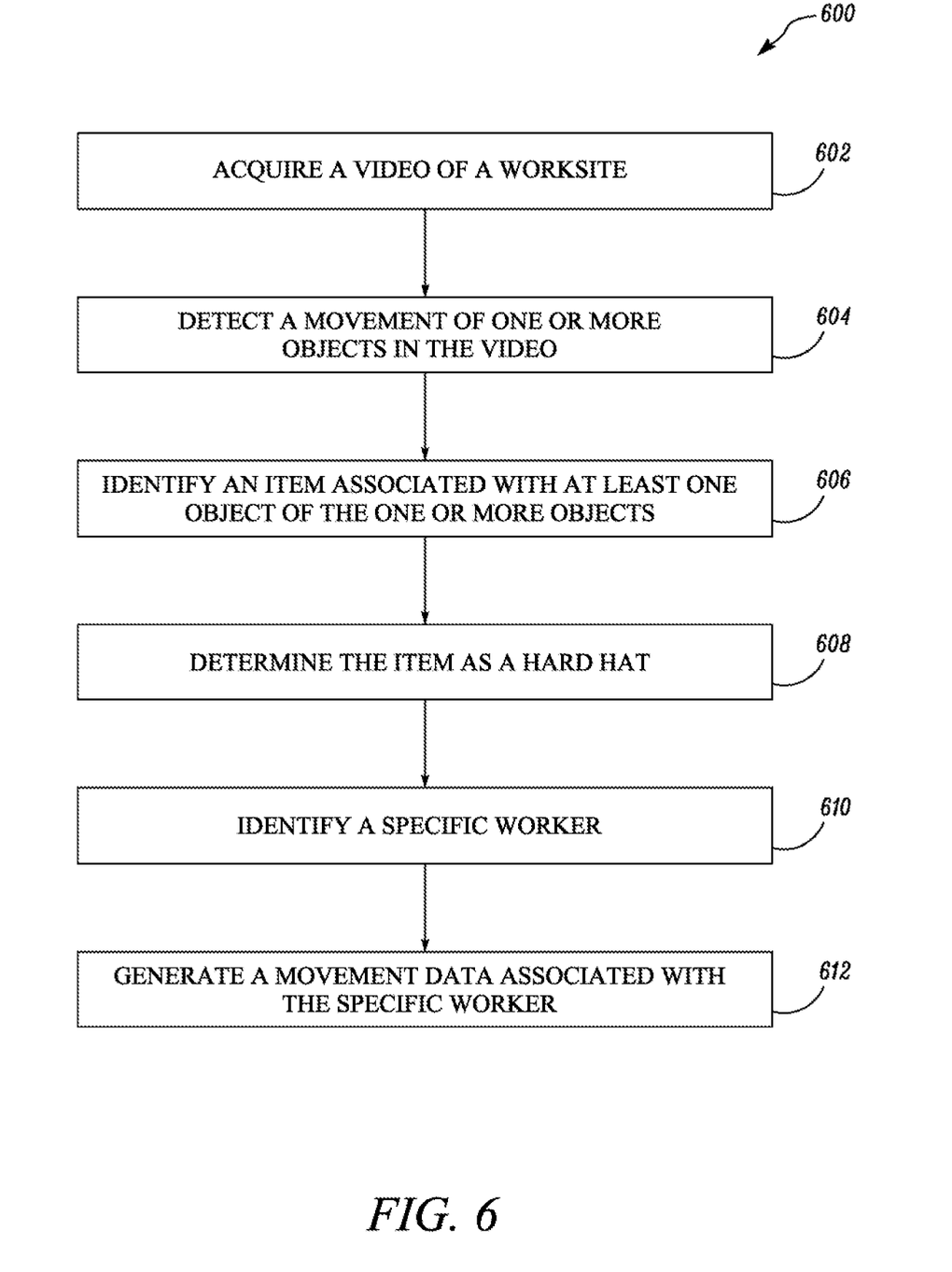
FIG. 6 is an exemplary flowchart depicting an exemplary method for tracking one or more workers at the worksite, in accordance with an embodiment of the disclosure.

Referring to FIG. 6, an exemplary method for tracking one or more workers 104 at the worksite 100 is disclosed. This method is discussed by way of a flowchart 600, and the method is discussed in conjunction with FIGS. 1 to 5. The method starts at block 602 of the flowchart 600.

At block 602, the processor 174 executes the set of instructions stored in the memory device 170 to perform the predetermined operation. More particularly, the processor 174 acquires a video of the worksite 100. An acquisition of a video may be from one or more of the image capturing devices 134. In some cases, the video may be captured in real time for facilitating performance of a real time tracking of each of the workers 104. In one alternative embodiment, the video may be acquired from a database or from the memory device 170, and may not correspond to a video captured in real time. The method proceeds to block 604.

At block 604, the processor 174 detects a movement of one or more objects in the video of the worksite 100. Each object of the one or more objects in the video may be representative of one or more of the workers 104, the mobile machines 120, and the stationary machines 122, at the worksite 100. Each such object in the video may be represented by multiple pixels in the video. For example, see object 164 (that corresponds to a worker at the worksite 100). The object 164 is represented by multiple pixels 180 in the portion of video 176 in FIG. 4. To detect a movement of the corresponding worker, the processor 174 detects a movement of the multiple pixels 180 associated with the object 164 in the video. A movement of the multiple pixels 180 may be relative to certain immovable pixels that surround the multiple pixels 180—for example, see immovable pixels 168 that correspond to an environment surrounding the multiple pixels 180 in the portion of video 176 in FIG. 4. In one scenario, the processor 174 may detect such movement by comparing pixel positions in successive image frames of the video against pixel positions in preceding image frames. In effect, segmentation and motion detection is performed at block 604 by the processor 174. The method proceeds to block 606.

At block 606, the processor 174 clusters a set of pixels 178 of the multiple pixels 180 based on a color of the set of pixels 178. For example, pixels of the set of pixels 178 includes a same, common color. For instance, the processor 174 may identity the set of pixels 178 that are closely clubbed together, having a common color blue. The set of pixels 178 represent the item 182, and by clustering the set of pixels 178 based on color, the processor 174 identifies the item 182 associated with the object 164, in the video. In an embodiment, the processor 174 may also analyze if the item 182, represented by the set of pixels 178, were moving in sync with a movement of the object 164 in the video. Such analysis may be performed by comparing multiple image frames of the video against each other. The method proceeds to block 608.

At block 608, the processor 174 determines a shape and/or a size of the set of pixels 178. For example, the processor 174 may determine a shape of the set of pixels 178 by use of an edge detection software that may be pre-stored and installed within the memory device 170. In another example, the processor 174 may determine a shape of the set of pixels 178 by checking a color difference of the set of pixels 178 relative to pixels that lie adjacent to the set of pixels 178. As a result, the processor 174 may define a contour or a silhouette of the set of pixels 178 at an interface where the pixels of the video switch color from one to the other. Accordingly, a shape of the set of pixels 178 may be determined.

By determination of the shape of the set of pixels 178, the processor 174 may determine whether the set of pixels 178 belongs or corresponds to any one of the hard hats 144. More particularly, the processor 174 compares the shape of the set of pixels 178 to a predefined shape associated with any of the hard hats 144, such as the first hard hat 146. A predefined shape associated with each of the hard hats 144 may be stored within the memory device 170, and may be retrieved from the memory device 170 by the processor 174 for such comparisons. If the shape of the set of pixels 178 matches with a predefined shape associated with any hard hat of the hard hats 144, such as the first hard hat 146, the processor 174 determines that the item 182 is a hard hat.

In some scenarios, it is possible that the processor 174 may perform a summation of a number of pixels that make up the set of pixels 178. If a result of summation were within a predefined range, the processor 174 may confirm that the set of pixels 178 corresponds to one of the hard hats 144. For example, a number of pixels in the multiple pixels 180 may increase, as the first worker 106 may change locations relative to the one or more image capturing devices 134. Therefore, the number of pixels within the set of pixels 178 may range between a maximum possible number and a minimum possible number. This maximum possible number and minimum possible number defines the predefined range.

In an embodiment, if there are more than one set of pixels found as potential representation of any hard hat, the processor 174 may maintain a track of the set of pixels, such as set of pixels 178, that is at least in a predefined position relative to the rest of the object 164. For example, the processor 174 may maintain as track of only those set of pixels that constitutes a top of the object 164 (where a hard hat may be found). In an embodiment, therefore, determining the item 182 as a hard hat includes identifying a plurality of sets of pixels corresponding to the shape of a hard hat, and selecting the set of pixels out of the plurality of sets of pixels that is disposed at a higher elevation relative to other sets of pixels out of the plurality of sets of pixels as the hard hat. In the depiction provided in FIG. 4, the set of pixels 178 constitutes a top of the object 164, and is at a higher elevation relative to any other set of pixels associated with the object 164.

In an embodiment, determining the item 182 as a hard hat includes determining a size of the set of pixels 178, and comparing the size of the set of pixels 178 to a predefined size associated with any hard hat of the hard hats 144. In yet another embodiment, the processor 174 identifies a set of pixels, such as the set of pixels 178, as noise by comparing a size of such a set of pixels to a predefined size associated with the hard hat, and determining if the size of the set of pixels were not a match to the predefined size. Additionally, or optionally, the processor 174 identifies a set of pixels, such as the set of pixels 178, as noise by comparing the shape of such a set of pixels to a predefined shape associated with the hard hat, and determining if the shape of the set of pixels were not a match to the predefined shape. The method proceeds to block 610.

At block 610, the processor 174 identifies the specific worker that the hard hat corresponds to. For this purpose, the processor 174 matches (or compares) a color of the set of pixels 178 (which for example is blue) with each of the colors associated with the first hard hat 146, second hard hat 148, third hard hat 150, and the fourth hard hat 152, prestored within the memory device 170. For example, the processor 174 may retrieve and use charts and tables stored within the memory device 170 for such comparisons. Since in the above example the first hard hat 146, with the blue color, is associated with the first worker 106, the specific worker is identified as the first worker 106 by the processor 174, as a result of the comparison. Effectively, therefore, the processor 174 identifies the specific worker associated with the first hard hat 146 based on the color of the set of pixels 178.

In an embodiment, the specific worker may be identified when the color of the set of pixels 178 associated with the first hard hat 146 is within a predetermined color gradient range relative to the color of the hard hat associated with the specific worker. For example, an actual color of the first hard hat 146, or a color at certain portions of the first hard hat 146 may be faded or be worn out, and thus a color data stored in the memory device 170 may differ from an actual color in certain portions (or in all) of the first hard hat 146. Therefore, by defining a predetermined color gradient range, different shades of a color may still be identified as one, same color. In an example, a lighter shade of blue color or a darker shade of blue color may be identified as one, same blue color. In an exemplary embodiment, pixels 190 are shown in FIG. 4 that represent a worn-out color patch on the hard hat (i.e. the first hard hat 146), but which are identified as the same color as that of the other pixels of the set of pixels 178 since the pixels 190 may fall within a related predetermined color gradient range. The method proceeds to block 612.

At block 612, the processor 174 generates a movement data associated with the specific worker (i.e. the first worker 106) based on a tracking of the first hard hat 146. The movement data pertains to a change in a location of the specific worker (i.e. the first worker 106) during a duration of the video.

Referring to FIGS. 2 and 5, to generate a movement data, a supervisor, monitoring activities of the workers 104, may either in real time retrieve a live video feed of the worksite 100 from the image capturing devices 134, or may retrieve an already existing (i.e. a prestored) video feed of the worksite 100 from the memory device 170 or from any alternate source. In an embodiment, while viewing a video feed, the supervisor (or a user) may access an image frame of the video and demarcate one or more zones in said image frame. As a result, the processor 174 may define and replicate the demarcated one or more zones in each of the successively occurring image frames of the video based on the user input. A zone, as discussed herein, may correspond to a closed boundary. In an embodiment, it is possible that the supervisor may simply demarcate the one or more zones in a running video feed. A duration of a presence of the specific worker (such as first worker 106) inside the one or more zones is based on the movement data corresponding the specific worker determined by the processor 174. In brevity, a movement data associated with any specific worker, such as the first worker 106, is based on locating a hard hat, such as the first hard hat 146, associated with the specific worker, relative to the one or more zones.

In an example, and with reference to FIG. 2, the supervisor demarcates a first zone 200 as a 'work zone', a second zone 202 as a 'transit zone', and a third zone 204 as a 'non-work zone', in the video feed. By tracking the first worker 106 according to the method disclosed above, the processor 174 may determine a time for which the first worker 106 has spent time in each of the first zone 200, the second zone 202, and the third zone 204. The results of the time spent by the first worker 106 may be represented through various depictions, such as by a pie chart (see examples shown in FIG. 5), or by various other known forms. Similar representations may be sought for each of the second worker 108, the third worker 110, and the fourth worker 112, as well. Exemplarily, the depictions in FIG. 5 represent a first pie graph 210, a second pie graph 212, a third pie graph 214, and a fourth pie graph 216. Each of the first pie graph 210, second pie graph 212, third pie graph 214, and fourth pie graph 216, illustrate a percentage analysis of a time spent by each of the first worker 106, the second worker 108, the third worker 110, and the fourth worker 112, respectively, in various activities at the worksite 100. For example, by way of the first pie graph 210, it may be noted that the first worker 106 has spent maximum time (for example, 70% of time) in a productive activity (represented by sector 220 of the first pie graph 210), minimum time (for example, 8% of time) in a non-productive activity (represented by sector 222 of the first pie graph 210), and relatively moderate time (for example, 22% of time) in transit (represented by sector 224 of the first pie graph 210). By way of such an output, an aggregate monthly, and/or yearly productivity data of the first worker 106 may be computed. Further, a similar principle may be applied to compute a productivity for each of the second worker 108, the third worker 110, and the fourth worker 112 by reference to the second pie graph 212, the third pie graph 214, and the fourth pie graph 216, respectively. The method ends at block 612.

A percentage analysis of a useful time spent by a worker is an efficient scale by which a productivity of a worker may be analyzed and determined. The present disclosure enables such an analysis by use of substantially inexpensive articles, such as hard hats, and by a server that includes a processor configured to perform such an operation. By use of hard hats with different colors, no substantial burden of cost is impinged on manufacturers who run and manage worksites such as the one that has been disclosed in the present disclosure. Effectively, apart from making a safer work environment, hard hats may now also be used also to measure worker productivity, and which may be possible by simply changing hard hat colors. Moreover, it may also be noted that such a system helps reduce fixed costs associated with maintaining a manually functioning supervisory department and helps achieve targets related to lean manufacturing principles and enhances overall productivity.

Although a number of components of the system are disclosed, it is possible that one or more aspects of the present disclosure are implemented with one or more of these components removed or omitted from the system. In some cases, therefore, a description of an immediate environment surrounding the processor 174 and the hard hats 144 may be seen as being purely exemplary in nature, and it may be understood that the present disclosure discusses such an environment only to contemplate and explain one possible application of the system 130.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method for tracking one or more workers at a worksite, the method comprising:
   acquiring, by a processor, a video of the worksite;
   identifying, by the processor, a plurality of user-demarcated zones within the video, including at least one of a work zone, a transit zone, and a non-work zone;
   detecting, by the processor, a movement of one or more objects in the video, wherein each object of the one or more objects is represented by a plurality of pixels in the video;
   identifying, by the processor, an item associated with at least one object of the one or more objects by clustering a set of pixels of the plurality of pixels of the at least one object based on a color of the set of pixels;
   determining, by the processor, the item as a hard hat associated with one of the one or more workers based on at least a shape of the set of pixels;
   identifying, by the processor, a specific worker associated with the hard hat based on the color of the set of pixels;
   generating, by the processor, a movement data associated with the specific worker based on a tracking of the hard hat, wherein the movement data pertains to a change in a location of the specific worker during a duration of the video; and
   determining, by the processor, durations of a presence of the specific worker inside the at least one of the work zone, the transit zone, and the non-work zone based on the movement data.

2. The method of claim 1, wherein determining the item as the hard hat includes determining a size of the set of pixels, and comparing the size of the set of pixels to a predefined size associated with the hard hat.

3. The method of claim 1 further including identifying, by the processor, the set of pixels as noise by comparing at least one of:
 a size of the set of pixels to a predefined size of the set of pixels associated with the hard hat, or
 the shape of the set of pixels to a predefined shape of the set of pixels associated with the hard hat.

4. The method of claim 1 further including:
 generating, by the processor, a representation of percentages of time associated with productive activities, transit activities, and non-productive activities, wherein a first percentage of time associated with the productive activities is based on a first duration of the presence of the specific worker inside the work zone, a second percentage of time associated with the transit activities is based on a second duration of the presence of the specific worker inside the transit zone, and a third percentage of time associated with the non-productive activities is based on a third duration of the presence of the specific worker inside the non-work zone.

5. The method of claim 1, wherein each worker of the one or more workers has a different color of an associated hard hat.

6. The method of claim 1, wherein the specific worker is identified when the color of the set of pixels associated with the hard hat is within a predetermined color gradient range relative to the color of the hard hat associated with the specific worker.

7. The method of claim 1, wherein determining the item as the hard hat includes identifying a plurality of sets of pixels corresponding to the shape of the hard hat, and selecting the set of pixels out of the plurality of sets of pixels that is disposed at a higher elevation relative to other sets of pixels out of the plurality of sets of pixels as the hard hat.

8. A server for tracking one or more workers at a worksite, the server comprising:
 a memory device configured to store a set of computer readable instructions; and
 a processor configured to execute the set of computer readable instructions to:
  acquire a video of the worksite;
  identify a plurality of user-demarcated zones within the video, including at least one of a work zone, a transit zone, and a non-work zone;
  detect a movement of one or more objects in the video, wherein each object of the one or more objects is represented by a plurality of pixels in the video;
  identify an item associated with at least one object of the one or more objects by clustering a set of pixels of the plurality of pixels of the at least one object based on a color of the set of pixels;
  determine the item as a hard hat associated with one of the one or more workers based on at least a shape of the set of pixels;
  identify a specific worker associated with the hard hat based on the color of the set of pixels;
  generate a movement data associated with the specific worker based on a tracking of the hard hat, wherein the movement data pertains to a change in a location of the specific worker during a duration of the video; and
  determine durations of a presence of the specific worker inside the at least one of the work zone, the transit zone, and the non-work zone based on the movement data.

9. The server of claim 8, wherein each worker of the one or more workers has a different color of an associated hard hat.

10. The server of claim 8, wherein the processor is configured to identify the specific worker when the color of the set of pixels associated with the hard hat is within a predetermined color gradient range relative to the color of the hard hat associated with the specific worker.

11. The server of claim 8, wherein determining the item as the hard hat includes identifying a plurality of sets of pixels corresponding to the shape of the hard hat, and selecting the set of pixels out of the plurality of sets of pixels that is disposed at a higher elevation relative to other sets of pixels out of the plurality of sets of pixels as the hard hat.

12. The server of claim 8, wherein the processor is configured to determine a size of the set of pixels, and compare the size of the set of pixels to a predefined size associated with the hard hat.

13. The server of claim 8, wherein the processor is configured to identify the set of pixels as noise by comparing at least one of:
 a size of the set of pixels to a predefined size of the set of pixels associated with the hard hat, or
 the shape of the set of pixels to a predefined shape of the set of pixels associated with the hard hat.

14. The server of claim 8, wherein the processor is configured to:
 generate a representation of percentages of time associated with productive activities, transit activities, and non-productive activities, wherein a first percentage of time associated with the productive activities is based on a first duration of the presence of the specific worker inside the work zone, a second percentage of time associated with the transit activities is based on a second duration of the presence of the specific worker inside the transit zone, and a third percentage of time associated with the non-productive activities is based on a third duration of the presence of the specific worker inside the non-work zone.

15. A system for tracking one or more workers at a worksite, the system comprising:
 one or more hard hats associated with the one or more workers; and
 a processor configured to:
  acquire a video of the worksite;
  identify a plurality of user-demarcated zones within the video, including at least one of a work zone, a transit zone, and a non-work zone;
  detect a movement of one or more objects in the video, wherein each object of the one or more objects is represented by a plurality of pixels in the video;
  identify an item associated with at least one object of the one or more objects by clustering a set of pixels of the plurality of pixels of the at least one object based on a color of the set of pixels;
  determine the item as a hard hat of the one or more hard hats based on at least a shape of the set of pixels;
  identify a specific worker associated with the hard hat based on the color of the set of pixels;
  generate a movement data associated with the specific worker based on a tracking of the hard hat, wherein the movement data pertains to a change in a location of the specific worker during a duration of the video; and determine durations of a presence of the specific worker inside the at least one of the work zone, the transit zone, and the non-work zone based on the movement data.

16. The system of claim 15, wherein the video of the worksite is acquired by one or more image capturing devices positioned at the worksite.

17. The system of claim 15, wherein each worker of the one or more workers has a different color of an associated hard hat.

18. The system of claim 15, wherein the processor is configured to determine a size of the set of pixels, and compare the size of the set of pixels to a predefined size associated with the hard hat.

19. The system of claim 15, wherein the processor is configured to identify the set of pixels as noise by comparing at least one of:

a size of the set of pixels to a predefined size of the set of pixels associated with the hard hat, or the shape of the set of pixels to a predefined shape of the set of pixels associated with the hard hat.

20. The system of claim 15, wherein the processor is configured to:

generate a representation of percentages of time associated with productive activities, transit activities, and non-productive activities, wherein a first percentage of time associated with the productive activities is based on a first duration of the presence of the specific worker inside the work zone, a second percentage of time associated with the transit activities is based on a second duration of the presence of the specific worker inside the transit zone, and a third percentage of time associated with the non-productive activities is based on a third duration of the presence of the specific worker inside the non-work zone.

\* \* \* \* \*